(12) United States Patent
Woicke

(10) Patent No.: US 8,844,136 B2
(45) Date of Patent: Sep. 30, 2014

(54) FILLING BODY

(75) Inventor: Nina Woicke, Aachen (DE)

(73) Assignee: GEA 2H Water Technologies GmbH, Wettringen (DE)

( * ) Notice: Subject to any disclaimer, the term of this patent is extended or adjusted under 35 U.S.C. 154(b) by 892 days.

(21) Appl. No.: 12/520,636

(22) PCT Filed: Dec. 10, 2007

(86) PCT No.: PCT/EP2007/010748
§ 371 (c)(1),
(2), (4) Date: Sep. 29, 2009

(87) PCT Pub. No.: WO2008/077474
PCT Pub. Date: Jul. 3, 2008

(65) Prior Publication Data
US 2010/0015385 A1    Jan. 21, 2010

(30) Foreign Application Priority Data

Dec. 22, 2006 (DE) .......... 10 2006 061 043

(51) Int. Cl.
| | |
|---|---|
| *B21D 53/02* | (2006.01) |
| *B29C 65/00* | (2006.01) |
| *B29C 67/00* | (2006.01) |
| *B29C 65/60* | (2006.01) |
| *F28F 25/08* | (2006.01) |
| *B01J 19/32* | (2006.01) |
| *B29C 65/56* | (2006.01) |
| *B29K 105/06* | (2006.01) |
| *B29K 101/12* | (2006.01) |
| *B29K 27/06* | (2006.01) |
| *B29K 27/00* | (2006.01) |
| *B29K 105/16* | (2006.01) |
| *B29L 31/60* | (2006.01) |
| *B29K 23/00* | (2006.01) |
| *B29L 31/18* | (2006.01) |

(52) U.S. Cl.
CPC .............. *F28F 25/087* (2013.01); *B29C 66/45* (2013.01); *B01J 2219/32275* (2013.01); *B29C 66/8322* (2013.01); *B29C 67/0029* (2013.01); *B29C 66/43* (2013.01); *B29K 2105/06* (2013.01); *B01J 2219/32213* (2013.01); *B29K 2101/12* (2013.01); *B01J 2219/3288* (2013.01); *B29C 65/607* (2013.01); *B01J 2219/3284* (2013.01); *B29C 66/438* (2013.01); *B29K 2027/06* (2013.01); *B29C 66/81429* (2013.01); *B29K 2027/16* (2013.01); *B29K 2105/16* (2013.01); *B01J 2219/32237* (2013.01); *B01J 2219/3221* (2013.01); *B01J 19/32* (2013.01); *B01J 2219/32483* (2013.01); *B29C 65/609* (2013.01); *B29L 2031/608* (2013.01); *B29K 2023/12* (2013.01); *B29L 2031/18* (2013.01); *B29C 65/56* (2013.01); *B01J 2219/32251* (2013.01)
USPC ............... 29/890.035; 29/890.039; 29/521

(58) Field of Classification Search
USPC .............. 29/432.1, 432.2, 521, 509, 890.035, 29/890.039
See application file for complete search history.

(56) References Cited

U.S. PATENT DOCUMENTS

| | | | | |
|---|---|---|---|---|
| 2,288,308 | A * | 6/1942 | Williams | 29/566 |
| 3,798,299 | A * | 3/1974 | Gumm et al. | 264/249 |
| 4,395,448 | A |  7/1983 | Lefevre et al. | |
| 5,305,517 | A * | 4/1994 | Schleicher | 29/798 |
| 5,408,735 | A * | 4/1995 | Schleicher | 29/432.2 |
| 6,544,628 | B1 |  4/2003 | Aull et al. | |
| 6,684,479 | B2 * | 2/2004 | Wang et al. | 29/521 |
| 6,877,205 | B2 * | 4/2005 | Aull et al. | 29/521 |

FOREIGN PATENT DOCUMENTS

| | | | |
|---|---|---|---|
| EP | 0293003 | 11/1988 | |
| EP | 561310 A1 * | 9/1993 | B29C 51/08 |
| GB | 945110 | 12/1963 | |

OTHER PUBLICATIONS

International Search Report for corresponding application No. PCT/EP2007/010748 completed Mar. 19, 2008.

English language translation of the International Preliminary Report on Patentability corresponding to application No. PCT/EP2007/010748 issued Jul. 2009.

\* cited by examiner

*Primary Examiner* — Jermie Cozart

(74) *Attorney, Agent, or Firm* — Renner, Otto, Boisselle & Sklar, LLP

(57) ABSTRACT

A filling body, comprising a plurality of plastic foils, which are undulated, wherein a plastic foil has a plurality of connecting elements for connecting a plastic foil to other plastic foils via a plurality of form-fitting connections. The filling body is configured such that two plastic foils are connected to a plastic foil pair, and plastic foil pairs are connected to other plastic foil pairs. The connecting elements are positioned on the plastic foils such that upon joining two plastic foils to a plastic foil pair, the still unconnected connecting elements can be joined into connecting element pairs on opposite sides of the two plastic foils. The connecting element pairs are located exclusively in the vicinity of the edges of the two plastic foil pairs.

3 Claims, 8 Drawing Sheets

FILLING BODY

1. SUBJECT MATTER

Figure 1:
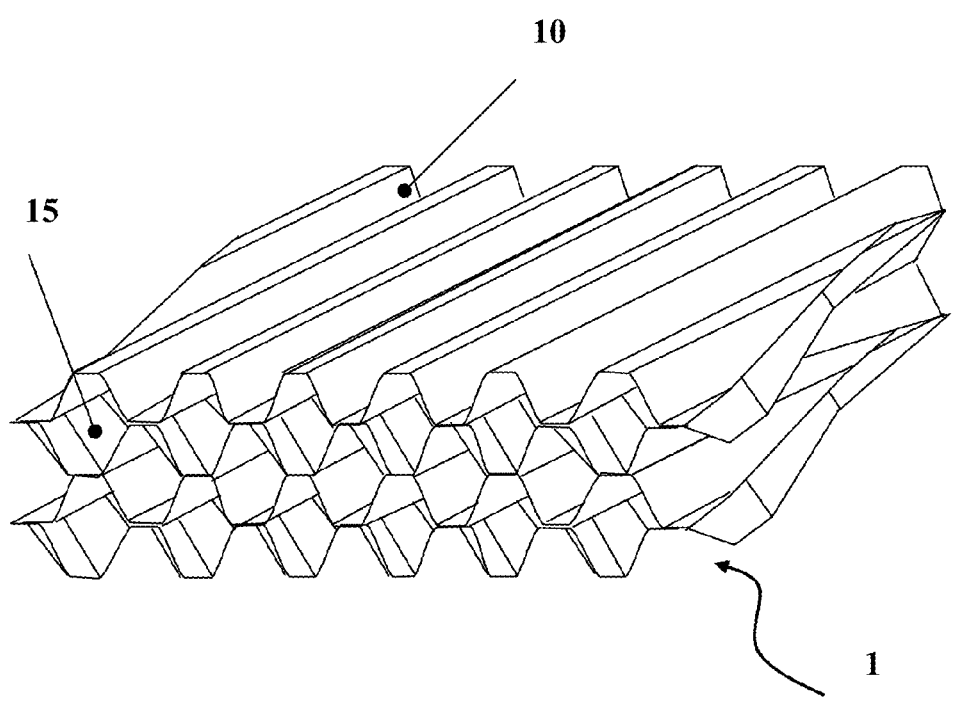

The present invention is concerned with connecting corrugated plastic sheets to contact bodies which among other purposes are used for the cooling of water in cooling towers.

2. PRIOR ART

Contact bodies are employed in various applications in which a liquid and a gas are brought into contact with each other. For this purpose, it is important that the contact body has an exchange surface between gas and liquid which is as large as possible. Such an exchange surface can be used e.g. for the heat transfer in wet cooling towers.

Contact bodies are often made out of many layers of corrugated plastic sheets. The corrugation of the plastic sheets leads to channels in between two adjacent plastic sheets through which the liquid and the gas can be guided. Dependent on the orientation of the layers towards each other, liquid and gas can stream in the same direction, in the opposite direction or in an oblique way to each other. An important performance characteristic of such an application is the pressure loss which is experienced by the gas streaming through the contact body.

Meanwhile, there are many different forms of corrugated sheets which can be used for the construction of a contact body. The modifications of form are concerned among others things with the questions of a high specific surface, a small pressure drop, a high turbulence in the liquid phase and a small contamination rate of the contact body.

The joining process of the single sheets to a contact body can be performed in very different ways. A common process known in the art is gluing. This process has the significant disadvantage that a further material is brought into the system which can lead to possibly detrimental consequences for the overall properties of the packing tower, e.g. its fire performance or its chemical resistance. Further, glue regularly has a very limited action time before it is processed and can often be only applied under certain environmental conditions (moisture, temperature).

A further known method is thermal spot welding. This method has the disadvantage that is consumes very much energy. Besides, welding methods have to be used with much effort, since heat should not be applied beyond the welding spot. In this case, significant deformations of the sheet could arise which influence the above-mentioned applications of the contact body in a lasting negative way.

A further possibility for joining the plastic sheets consists of mechanical joining technologies. A usual mechanical connection is the so-called snap connection for which undercuts have to be placed into the sheet. However, such sheets with undercuts have the significant disadvantage that they cannot be stapled easily. Since the sheets have to be stored in a space-saving way and have to be transported, respectively, sheets with undercuts could not gain acceptance in the prior art.

U.S. Pat. No. 6,544,628 proposes another concept for connecting two plastic sheets. Here, the sheets are connected by several positive locks. Two cupular deformations are connected with each other in the positive lock according to this US patent: a positive projection in the upper surface of the lower corrugated sheet and a complementary negative shape in the lower surface of the upper corrugated sheet. Then, the cupular connection is deformed by applying forces in such a way that an interlocking of the form (positive lock) arises. At first, two sheets are connected by means of such positive locks in this known method. Then, the obtained pairs of sheets are connected with each other only at the edges, since many connections lying in the interior between the two pairs of sheets cannot be reached by the mechanical connecting tools. Thus, a significant number of cupular deformations remain unconnected in this method. Such non-deformed cupular connections project into the respective channels which are located between two sheets and increase the pressure loss of the streaming gases because of the reduced cross-section of the channel. Besides, the risk of contamination is increased for the channels with a smaller cross-section and thus also the risk of a total chocking which in turn destroys the functionality of the contact body. Besides, these non-deformed cupular connections basically do not contribute anything to the overall stability of the contact body.

Thus, the present invention solves the technical problem to provide a method for connecting plastic sheets which eliminates the described difficulties.

A further goal of the present invention is to generate positive locks between the plastic sheets in a more efficient and economic way.

3. SUMMARY OF THE INVENTION

This problem is solved by a contact body, comprising a plurality of plastic sheets each being corrugated, wherein each plastic sheet comprises a plurality of connection elements by which a plastic sheet can be connected with other plastic sheets by means of a plurality of positive locks, wherein the contact body is constructed in such a way that each of the plastic sheets is connected with another plastic sheet to a pair of plastic sheets and each pair of plastic sheets is connected with another pair of plastic sheets, characterized in that the connection elements of the plastic sheets are placed in such a way that when joining two plastic sheets to a pair of plastic sheets, connection elements not yet connected on the surfaces of the two plastic sheets facing each other can be connected to pairs of connection elements, wherein these pairs of connection elements are distributed over the whole surface of the two sheets and that when joining two pairs of plastic sheets with each other, the connection elements not yet connected on the surfaces of the two pairs of plastic sheets facing each other can be connected to pairs of connecting elements, wherein these pairs of connecting elements are located only near the edges of the two pairs of plastic sheets, such that essentially all connection elements which are located on the plastic sheets can be pairwise connected to positive locks in the successive construction of the contact body out of the single plastic sheets.

The placement of the connection elements on the plastic sheets avoids that non-connected connection elements remain in the interior of the contact body which disturb the streaming of the liquid and the gases, respectively. Therefore, the contact body according to the present invention has significantly improved streaming behavior which leads to an efficient cooling process, if such a contact body is used in a cooling tower.

Another aspect of the present invention is a method for constructing a contact body, wherein the contact body is constructed out of plastic sheets which comprise connection elements, wherein the method comprises the two following steps, wherein each step can be applied many times, wherein according to the first step, two plastic sheets are connected to a pair of plastic sheets by pairwise joining connection elements to positive lockings which are distributed over the whole surface of the two plastic sheets; and wherein according to the second step pairs of plastic sheets are connected with each other by pairwise joining of connection elements to positive lockings, which are located near the edges of the two pairs of plastic sheets characterized in that essentially all connection elements, which are located on the used plastic sheets, can be connected by means of a positive locks.

A further aspect of the invention is a method for connecting at least two corrugated plastic sheets to a contact body, comprising the following steps: providing a first corrugated plastic sheet with first connection elements; providing a second corrugated plastic sheet with second connection elements; positioning of the at least two corrugated plastic sheets in such a way that paired first and second connection elements are arranged in a position ready for connection; connecting the at least two plastic sheets by deforming the first and/or second connecting element, characterized in that first and/or second connecting elements are generated by means of cold-forming.

Such a cold-forming is a particularly economic and flexible method to generate connection elements in plastic sheets. In a particularly preferred embodiment of the present invention, the generation of connection elements by cold-forming can be combined with the generation of the positive lock between paired connection elements in a single step of operation.

A further aspect of the present invention is a method for connecting two corrugated plastic sheets during construction of a contact body, wherein a first corrugated plastic sheet is provided comprising projections as connection elements and the second corrugated plastic sheet is provided comprising holes as connection elements, wherein the two corrugated plastic sheets are arranged with respect to each other in such a way that projections and holes are arranged with respect to each other in a position ready for connection. Then, the two corrugated plastic sheets are moved towards each other, such that the projections are placed in the holes. Finally, the projections of the first plastic sheet are deformed, such that the two plastic sheets become connected.

On the one hand, such a connection of projection and hole has the advantage that projections can be placed into the holes in a particularly easy way, before the positive lock is generated. On the other hand, the placing of the projections into the holes exerts a certain clamping power which holds the two sheets together, if the projections are conically shaped. In a preferred embodiment of the projection-hole-connection, the projections are generated by hot forming, whereas the holes are punched.

A further aspect of the present invention is a method for generating a positive lock between two plastic sheets comprising the following steps: bringing two plastic sheets into contact at a contact point, wherein the plastic sheets are essentially parallel to each other at the contact point; positioning a negative mould with an opening near the contact point of the two plastic sheets; and moving a pin from the other side of the plastic sheets which contact each other in the direction of the negative mould; and successive pressing of the pin into the negative mould, such that the two plastic sheets lying between negative mould and pin are cold-formed at the contact point. In this method, in the pressed position, there is a distance between the pin and the wall of the negative mould which corresponds to the thickness of a half to four plastic sheets, such that during the cold-forming of the two plastic sheets, at the same time also a positive lock is generated between the two plastic sheets.

Such a narrow gap between pin and opening ensures that the plastic sheets lying in between are deformed in an appropriate way during the cold-forming, so that a stable positive lock is generated. This way, cold-forming and generating a positive lock can be performed in a single step which is particularly efficient and economic. Accordingly, the present invention also comprises a contact body in which the connections between the plastic sheets are generated according to this method.

Further preferred embodiments of the present invention are described in the dependent patent claims.

4. SHORT DESCRIPTION OF THE FIGURES

In the figures, preferred embodiments of the present invention are shown. One can see in:

FIG. 1: a schematic view of the construction of a contact body out of single corrugated plastic sheets.

Figure 2:
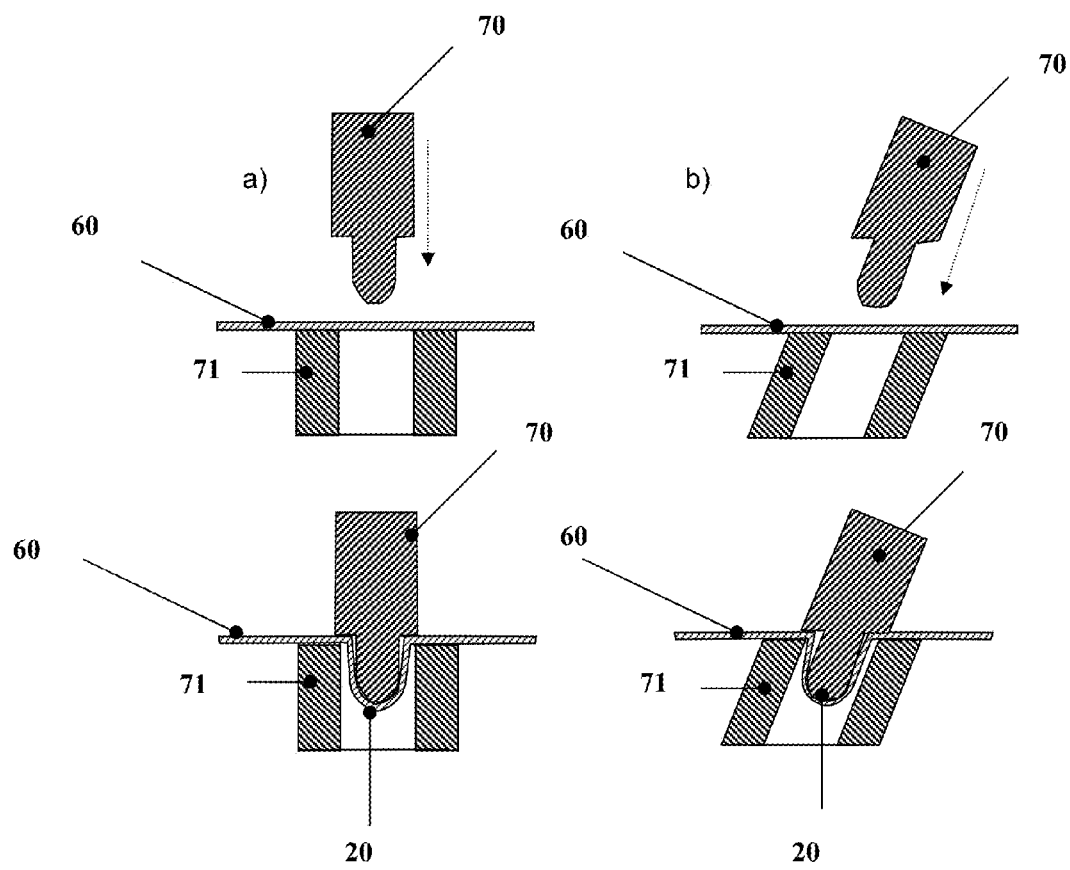

FIG. 2: a schematic view of the generation of projections in plastic sheets by means of cold-forming.

Figure 3:
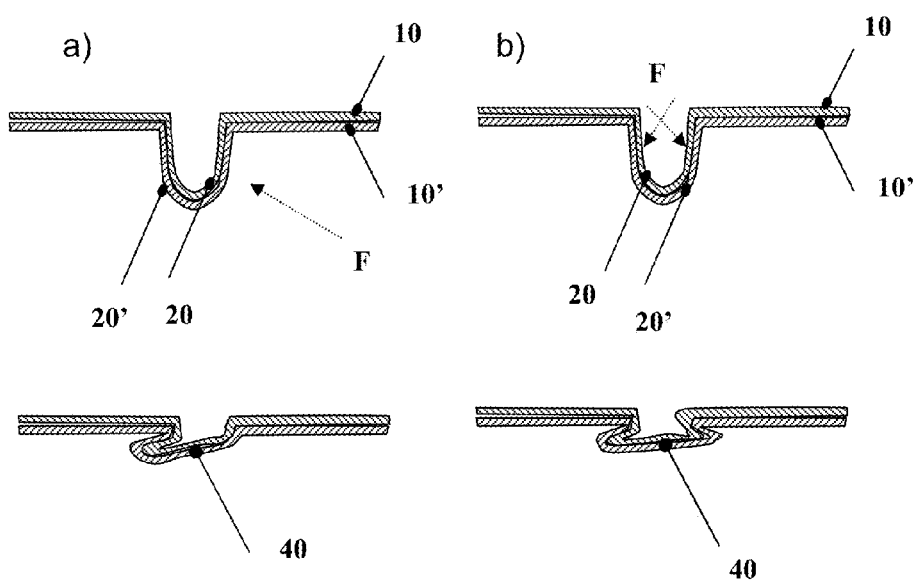

FIG. 3: a schematic view of the generation of positive locks in an embodiment of the present invention.

Figure 4:
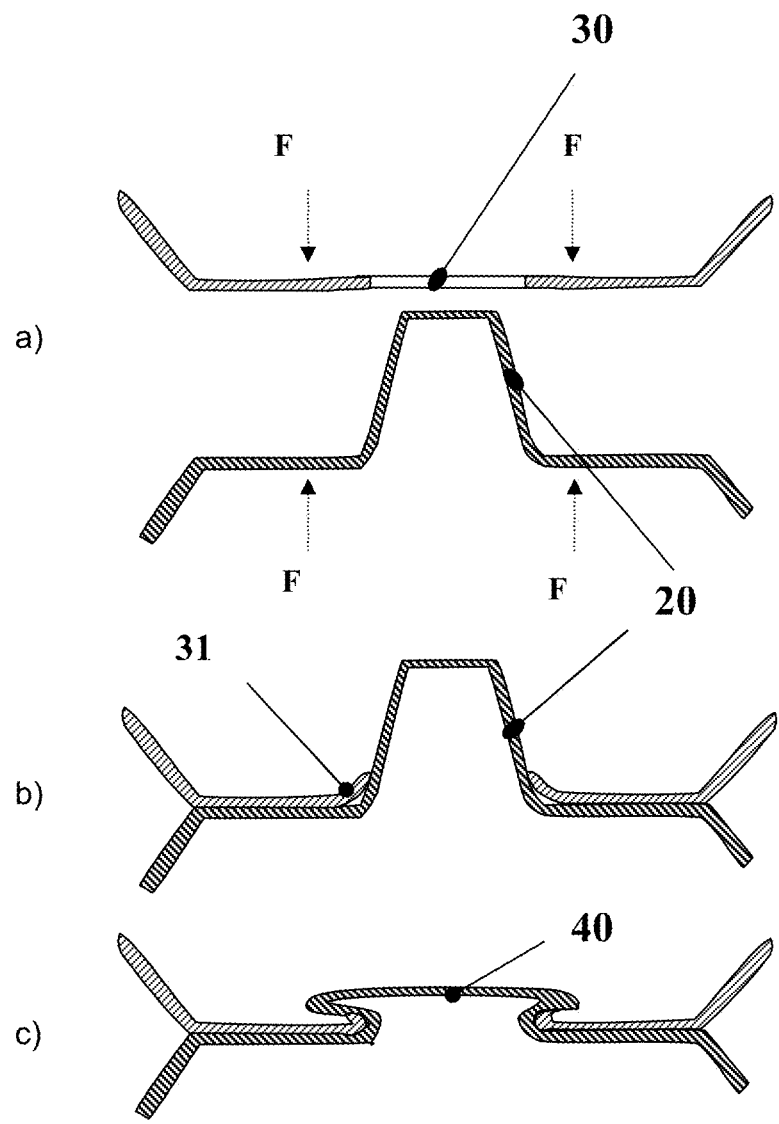

FIG. 4: a schematic view of an embodiment of the cap-hole-connection according to the present invention.

Figure 5:
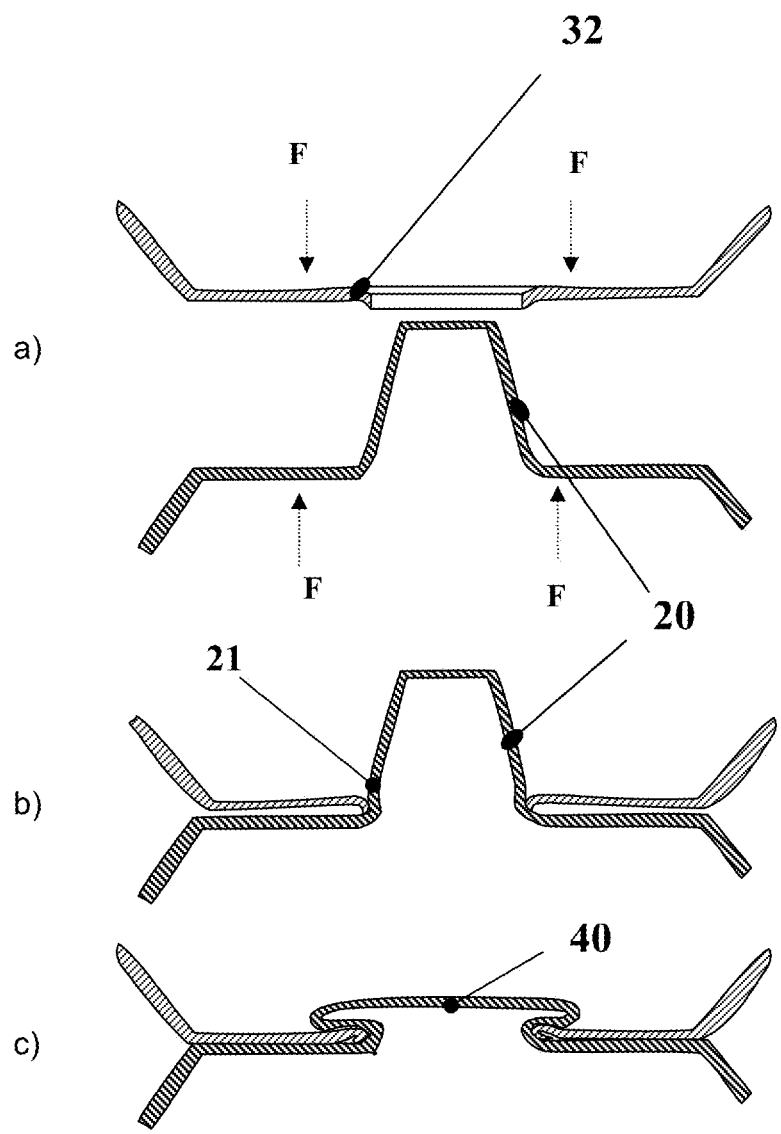

FIG. 5: a schematic view of an alternative embodiment of the cap-hole-connection according to the present invention.

Figure 5A:
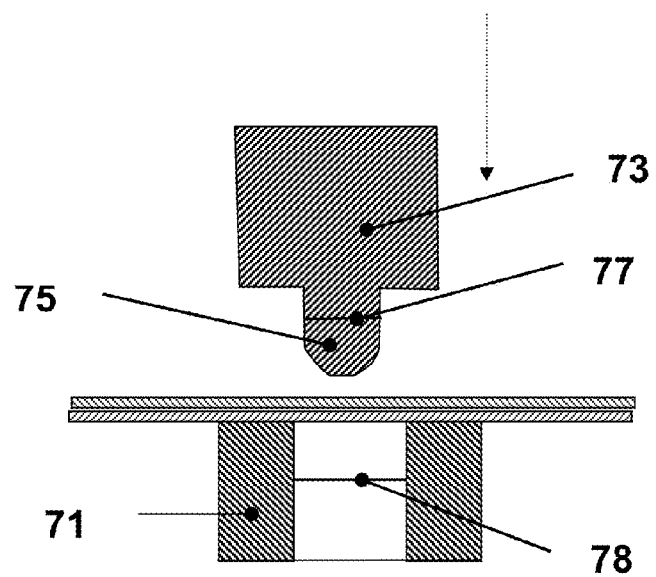
Figure 5A:
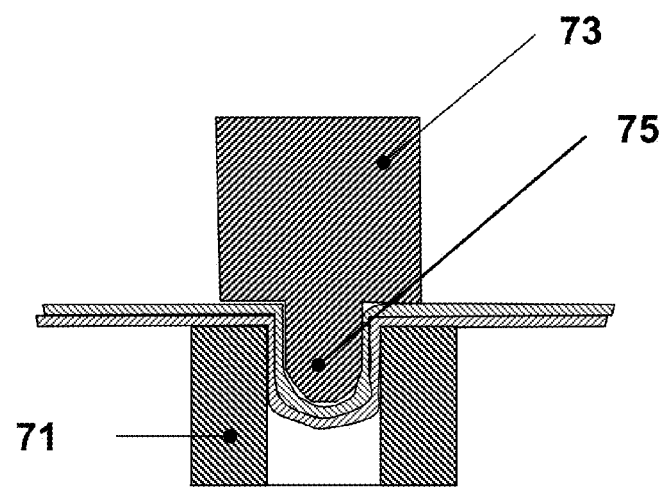

FIG. 5a: a schematic view of a single step method for the generation of a positive lock.

Figure 6:
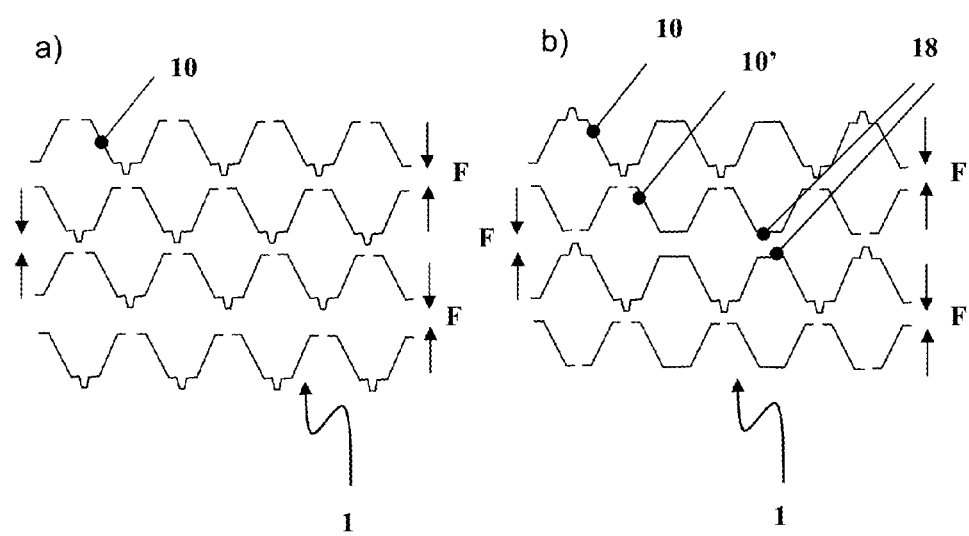

FIG. 6: a schematic cross-sectional view of the arrangement of caps and holes on adjacent plastic sheets according to an embodiment of the present invention.

Figure 7:
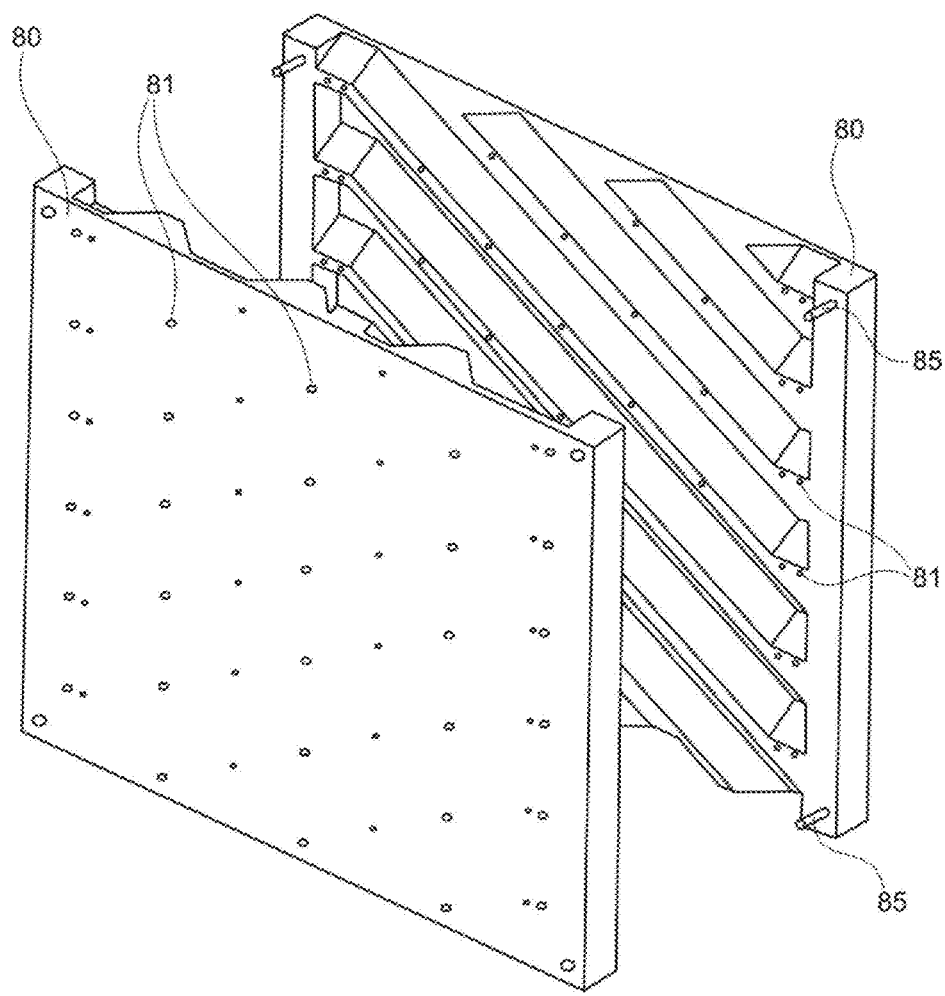

FIG. 7: shows an opened box which serves for aligning two sheets which are to be connected.

5. DETAILED DESCRIPTION OF PREFERRED EMBODIMENTS

In the following, presently preferred embodiments of the present invention are described.

FIG. 1 schematically shows the construction of a contact body 1 consisting of four corrugated plastic sheets 10 according to the present invention. It is understood that a contact body according to the present invention can comprise significantly more (or possibly less) layers. Equally, a corrugated plastic sheet 10 can have significantly more undulations, i.e. successive hills and valleys, than the one shown in FIG. 1.

The special form of the corrugated plastic sheet 10 is not important for the present invention. Accordingly, shapes of the undulation which are different from the one in FIG. 1 are also possible.

As shown in FIG. 1, each pair of adjacent plastic sheets 10 defines a number of channels 15 through which the liquid or the gas can be guided for which the contact body is made. Two plastic sheets 10 can be connected in such a way that their undulations move in the same direction which leads to particularly big channels in between. This is desirable for some applications. However, layers of plastic sheets 10 can also be twisted towards each other leading to an irregular pattern of channels and hence to particularly turbulent streams which can also be desirable depending on the application.

The plastic sheets 10 can principally be made out of arbitrary thermoplastics plastics. Further, one can add additives, filling materials or strengthening materials, in order to modify their properties. The plastic sheets can also be made by various manufacturing processes which include thermo-forming, hot pressing and extrusion, for example. Presently particularly preferred plastics are polyvinylchloride, polyvinylidenefluoride and polypropylene.

FIG. 2 schematically shows the cold-forming according to the present invention in a particular embodiment of the present invention. Here, projections 20 are generated in the plastic sheets. At a later stage, positive locks between two plastic sheets are generated out of these projections 20 (cf. FIG. 3 and FIG. 4). The material of the plastic sheet has to display stringy properties during the cold-forming so that a cold-forming can be performed.

In the cold-forming according to FIG. 2, a male mould 70 is used on the one side of the plastic material 60 and a negative mould 71 is used on the other side of the plastic material 60. The interior of the negative form 71 is larger than the male mould 70. Applying a force without any additional thermal energy, male mould and negative mould are pushed into each other and thus the plastic material 60 lying in between is deformed to a projection 20 corresponding to the shape of the male mould 70, as can be seen in FIG. 2. Of course, it is equally possible that the negative mould 71 determines the form of projection 20. The plastic material 60 lying in between can consist of either one plastic sheet or two plastic sheets which then are processed simultaneously.

In part a) of FIG. 2, the male mould 70 enclosing a right angle with the surface of the material deforms plastic material 60. In contrast, male mould 70 and negative mould are guided at a more acute angle with respect to the surface of the plastic material 60 in part b) of FIG. 2. Projection 20 resulting in this scheme is asymmetrically shaped which is possibly advantageous for the stability of a connection made with such a projection.

There are two possibilities for the sequence of the cold-forming process and the connection of the plastic sheets: According to the first possibility, the cold-forming process is performed with single plastic sheets. Then, two plastic sheets are connected to a pair of plastic sheets. According to the second possibility, the two plastic sheets first are put together and then the cold-forming process is performed on both sheets simultaneously. Here, one has to ensure that the sheets remain fixed with respect to each other during the cold-forming process, such that they cannot slip. This can be achieved by means of a frame or by means of fixing points which are generated by adaptation of the shape of the sheets.

According to the present invention, a connection of two plastic sheets is done by means of connection elements. An example for connection elements are the projections 20, 20' shown in FIG. 3. Here, the connection is done in the following way: at first, projections 20, 20' of an upper plastic sheet 10 and of a lower plastic sheet 10' are joined with one another (similar to the stacking of two cups into each other). Such a putting together of projections 20, 20' is shown in the respective upper parts of FIG. 3. This putting together of the two projections is not yet a very stable connection, since here only frictional forces work between the two projections. In fact, a connection is achieved by a deformation of the projections, as it is shown in the two lower parts of FIG. 3. This type of connection is described as positive lock 40, since the deformed putting together of the two projections yields a high resistance against the unfixing of the two plastic sheets to which the projections belong. There are different possibilities for the deformation. In part a) of FIG. 3, the deformation force acts on the two projections 20, 20' in a non-central manner, as can be inferred from the arrow which is labeled as F. Such a deformation leads to a clearly asymmetric positive lock 40. In contrast, in part b) of FIG. 3, the deformation force is applied to the two projections 20, 20' from the interior (cf. the two arrows F) which leads to a relatively symmetric positive lock 40. It is understood that in addition to these two examples still further ways of generating positive locks are possible.

A further possibility for generating positive locks is shown in FIG. 4, wherein likewise two plastic sheets are to be connected in this embodiment of the present invention. However, a projection 20 and a hole 30 are used as connection elements in each case.

Projection 20 is located on the lower plastic sheet, hole 30 is formed on the upper plastic sheet. When joining the sheets, one has the result that a projection faces a corresponding hole (cf. part a of FIG. 4).

In this type of connection, projections 20 are formed in such a way that they have a bigger cross-section near the plastic sheet than on the upper end. In the case of a circular cross section, such a projection formed in this special way is conical. Such a projection formed in this special way is named cap in the following.

A hole 30 has the same form as the corresponding cap 20 projected on the surface of the sheet. However, the size of the hole is smaller than this projection and greater than a cross-section through the upper end of the cap.

In part a) of FIG. 4, cap 20 and hole 30 are pushed together as can be seen from the 4 arrows of force F. The state in which cap 20 and hole 30 are joined together is shown in part b) of FIG. 4. Because of the above-mentioned conditions for the shape and the sizes of cap and hole, a certain clamping power results from the joining together of cap 20 and hole 30 which already holds the two plastic sheets together. This can be seen in part b) of FIG. 4 in that the edge 31 of hole 30 is slightly raised. In part c) of FIG. 4, one can finally see the positive lock for the cap-hole-unit which results from the deformation of the cap.

A further and particularly practical way to generate positive locks can be seen in FIG. 5a. In the upper part of this figure, a male mould and a negative mould 71 can be seen (similarly to the left part of FIG. 2) between which two plastic sheets put together are located. The male mould comprises a base 73 and a pin 75. Pin 75 has a cylindrical cross-section in this example and is rounded at the top having the shape of a hemisphere. Other shapes of the pin are, however, also conceivable. As indicated by the arrow, the male mould is moved in the direction of the negative mould 71. In the lower part of FIG. 5a, pin 75 is located in the opening of the negative mould 71. The two plastic sheets have been cold-formed to a protuberance having the shape of pin 75 by the workings of the force of pin 75.

It is important for this method that the diameter 77 of pin 75 (having a cylindrical cross-section) is not much smaller than the diameter 78 of the circular opening of negative mould 71 (cf. upper part of FIG. 5b). In this case, a positive lock between the plastic sheets is generated at the same time when the plastic sheets are cold-formed. This is, since the small distance between pin 75 and the walls of the opening of the negative mould together with an appropriate application of force by means of pin 75 ensures that the generated protuberances are deformed in an appropriate way. After the strong impressing of the pin into the opening, the sheets can only be detached from each other, if a great force is applied (positive lock). It has been found in experiments that in order to have a stable positive lock between pin 75 and the wall of negative mould 71 in the pressed state, a distance is used which corresponds to the thickness of a half to four plastic sheets. Thus, the difference between diameter 77 of pin 75 and diameter 78 of the opening of the negative mould according to the upper part of FIG. 5b corresponds to the thickness of 1 to 8 plastic sheets.

In preferred embodiments, a very stable positive lock has been generated, if in the pressed state a distance is used between pin 75 and the wall of negative mold 71 which corresponds to the thickness of one to two plastic sheets. It is understood that pin 75 and the corresponding opening do not have to have a circular circumference; they can also have an elliptical or polygonal cross-section etc. Important is only the ratio of dimensions of pin and opening with respect to each other.

This method for generating positive locks is a single step method in which the cold-forming of the plastic sheets and a positive lock are generated simultaneously without the need for further tools for deforming the cupular connections as has been described in previous examples. Therefore, this method is particularly efficient and economic. In particular, if this single step method is used, the corrugated sheets can be manufactured in the plant without any connection elements and can be transported in this state to the construction site. Only at the construction site, the connection elements (protuberances) are generated on the sheets and connected by means of the positive lock at the same time. This makes possible a particularly high flexibility, since it is decided only at the construction site at which locations the sheets are connected with each other, such that particular properties of the special contact body can be taken into account.

In FIG. 5, an alternative and particularly advantageous embodiment of the cap-hole-connection according to the present invention is shown. Here, hole 30 is modified in such a way that the edges of the hole additionally comprise a curvature 32 (cf. part a of FIG. 5). In the state in which cap and hole are joined together, which is seen in part b) of FIG. 5, this curvature of the edge of the hole effectuates that base 21 of cap 20 is slightly deformed. This leads to an improved clamping power between cap 20 and hole 30. In part c) of FIG. 5, the resulting positive lock for cap and hole is shown for this embodiment of the present invention.

It is important for the connection of two plastic sheets that the sheets are aligned towards each other in the right way and that they do not slip with respect to each other during the process of connecting. In FIG. 7, a box is shown in its opened state. A sheet is put in a corresponding half 80 of the box for the purpose of aligning. To this end, the inner surfaces of the two halfs 80 of the box have a pre-shaped structure which is adapted to the size and orientation of the undulation of the used plastic sheets (cf. FIG. 1 for the undulation of the plastic sheets and the two arrows in FIG. 7 for the orientation of the pre-shaped structure in the box). As can be seen in FIG. 7, the right half of the box has connection pins 85 at its four corners and the left half of the box has corresponding holes (not shown). If the connection pins 85 are placed into these holes, the two halfs 80 of the box are aligned towards each other in a non-slippery way. As the two plastic sheets which are inserted into the box are firmly aligned relative to half 80 of the box by the pre-shaped structure, the two plastic sheets are also aligned towards each other and are secured against slipping. As can be also be inferred from FIG. 7, a plurality of holes 81 is located on the halfs 80 of the box, wherein a hole of the one half of the box faces a hole of the other half of the box, if the box is closed.

In the above-described single step method for the generation of connections, the alignment of the sheets is particularly important, since here the pre-fabricated connection elements are missing which ensure a (small) friction between the sheets which are to be connected. If the two sheets are located in the closed box in the single-step method, connections can be generated at the locations of holes 81 in the above-described way. For this purpose, a negative mould (cf. element 71 in FIG. 5a) is placed on the one outer surface of the box and a pin (cf. element 75 in FIG. 5a) is placed on the other outer surface of the box, whereupon the pin is moved into the negative mould and the connection between the sheets is effectuated at this location.

However, the box is also very suitable for the connection of two sheets, if the methods for the connection of two sheets in which the sheets already comprise pre-fabricated connection elements matching each other (e.g. projection/hole or two cupular projections) are used. In these methods, one has to pay attention that the pattern of holes 81 on the box, i.e. the distances and sizes of holes 81 are in accordance with the distances and sizes of the pre-fabricated connection elements on the sheets, so that the connection elements can be reached through the holes 81 of the box and can be deformed to a positive lock. For these methods for connecting two sheets, the box prevents a slipping of the sheets during the process of connection, too.

There are also other apparatus than the described box which can align the sheets to be connected with respect to each other and can prevent slipping. For example, the sheets to be connected can be held tight or be clamped at each of the two sides facing each other. In particular, a pair of plastic sheets which consists of two connected plastic sheets can be connected with another pair of plastic sheets in the construction of a contact body in that the two pairs of plastic sheets are clamped at their respective side margins into an apparatus for clamping, so that they cannot slip during the connection process. Further, it is also conceivable that the tools which generate the positive locks between the sheets additionally comprise units which align and hold tight the sheets which are connected with each other.

In FIG. 6, two examples for schemes of connection according to an embodiment of the present invention are shown.

Two plastic sheets are connected to a pair of plastic sheets in the construction of a contact body. Here, positive locks can be generated over the whole surface of the involved plastic sheets. However, two pairs of plastic sheets can then be connected with each other by positive locks only at the edges, since the projections and/or holes in the interior of the two sheets are not reachable anymore for the mechanical tool which produces the positive locks.

In part a) of FIG. 6, the schematic construction of a contact body 1 from four single plastic sheets 10 is shown according to an embodiment of the present invention, wherein a cross-sectional view to the contact body 1 is shown. In this example, sheets 10 of the same type are connected with each other, wherein each sheet 20 has approximately the same number of caps and holes. First, the two upper plastic sheets and the two lower plastic sheets are connected according to the present invention (cf. the pairs of arrows F on the right side of FIG. 6a). Then, the two resulting pairs of plastic sheets are connected with each other (cf. the pair of arrows F on the left side of FIG. 6a).

In part b) of FIG. 6, the schematic construction of a contact body 1 from four single plastic sheets is shown according to another embodiment of the present invention, wherein again a cross-sectional view through the contact body is shown. In this embodiment, plastic sheets 10, 10' of different types are used. A plastic sheet 10 of the first type (cf. the uppermost sheet and the third sheet from above) has only projections (caps) as connection elements, a plastic sheet 10' of the second type (cf. the second sheet from above and the lowermost sheet) has only holes as connection elements. A sheet of the first type 10 is connected with a corresponding sheet of the second type 10' in this connection scheme, since the two types of sheets are used for the construction of the contact bodies in an alternate way. Thus, the positive locks are generated from pairs of cap and hole, as they have been described with reference to FIGS. 4 and 5.

However, a further feature of the embodiment according to FIG. 6b is important. The density of the affixed connection elements is twice as high at the edges of the shown four sheets (i.e. the left and right edge in this cross-sectional view) as in the interior of the sheets. For example, the corrugated sheet 10 comprises a projection on the mountain of the left edge and again a projection in the successive valley, whereas in the interior of sheet 10, projections are located only in valleys (cf.

sheet 10 in FIG. 6b). The same holds for the arrangement of holes on sheet 10'. This inventive arrangement of connection elements on the sheets ensures that essentially no unconnected connection element remains, after the contact body has been constructed from the plastic sheets. In the construction according to FIG. 6b, two different plastic sheets 10, 10' are first connected to a pair of plastic sheets, wherein positive locks can be generated over the whole surface also for this arrangement of connection elements. For the successive connection of the pairs of plastic sheets, unconnected connection elements, which can be joined for the positive lock of pairs of plastic sheets, only remain at the edges. This way, essentially all connection elements can be connected to positive locks. In the interior of the connecting area between the two pairs of plastic sheets, areas of support are generated which consist of two even areas belonging to one of the involved pairs of plastic sheets (cf. the two areas 18 in FIG. 6b).

The invention claimed is:

1. A method for generating a positive lock between two plastic sheets, comprising the following steps:
   bringing the two plastic sheets into contact at a contact point, wherein the plastic sheets are essentially parallel to each other;
   positioning a negative mould with an opening near the contact point of the two plastic sheets; and
   moving a pin from the other side of the plastic sheets contacting each other in the direction of the negative mould and pushing the pin into the negative mould to a pressed state, such that the two plastic sheets lying between negative mould and pin are cold-formed to create a cupular connection,
   wherein in the pressed state the pin and a side wall of the negative mould define therebetween a distance in the range of one half the thickness of one of the two plastic sheets to four times the thickness of said one of the two plastic sheets, such that said moving step of said pin as a single step causes a positive lock at the cupular connection between the two plastic sheets to be simultaneously generated with the cold-forming of the two plastic sheets without the need for further tools for the deformation of the plastic sheets.

2. The method according to claim 1, wherein the distance is equal the thickness of one to three plastic sheets.

3. The method according to claim 1, wherein in the pressed state a distance corresponding to the thickness of one to two plastic sheets exists between the pin and the wall of the negative mould.

* * * * *